3,463,043
MUSIC TEACHING DEVICE
Harold C. Keir, 3382 Warburton Ave.,
Santa Clara, Calif. 95051
Filed Aug. 11, 1967, Ser. No. 660,004
Int. Cl. G09b 15/00
U.S. Cl. 84—470            11 Claims

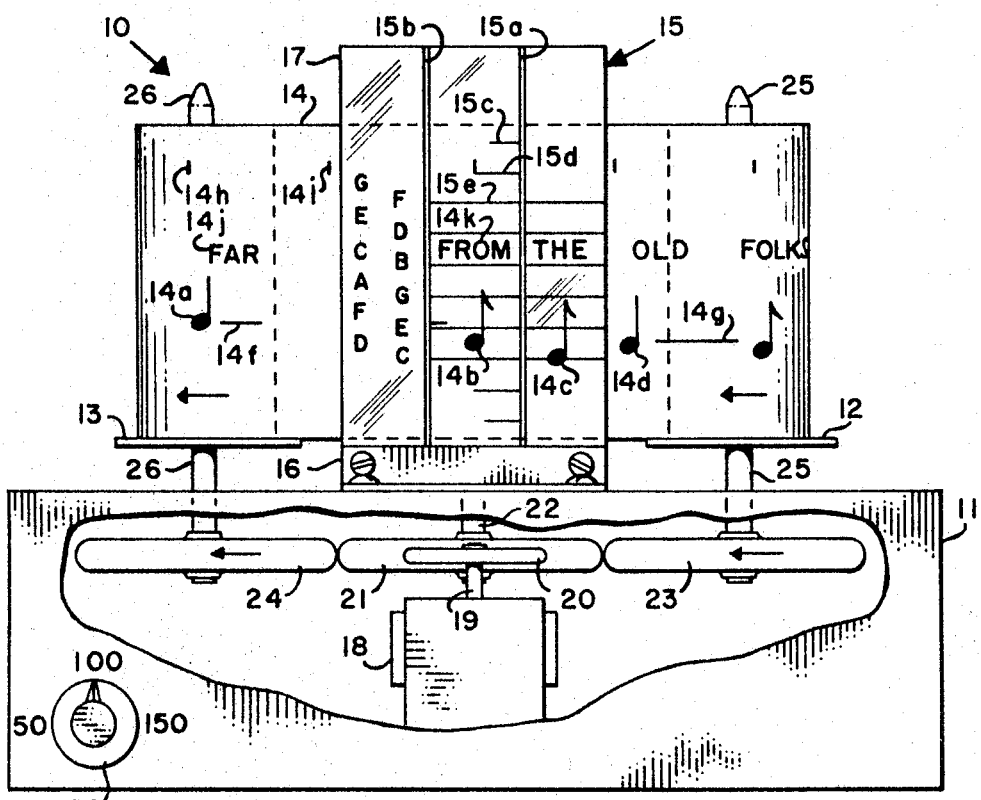
FIG. 1
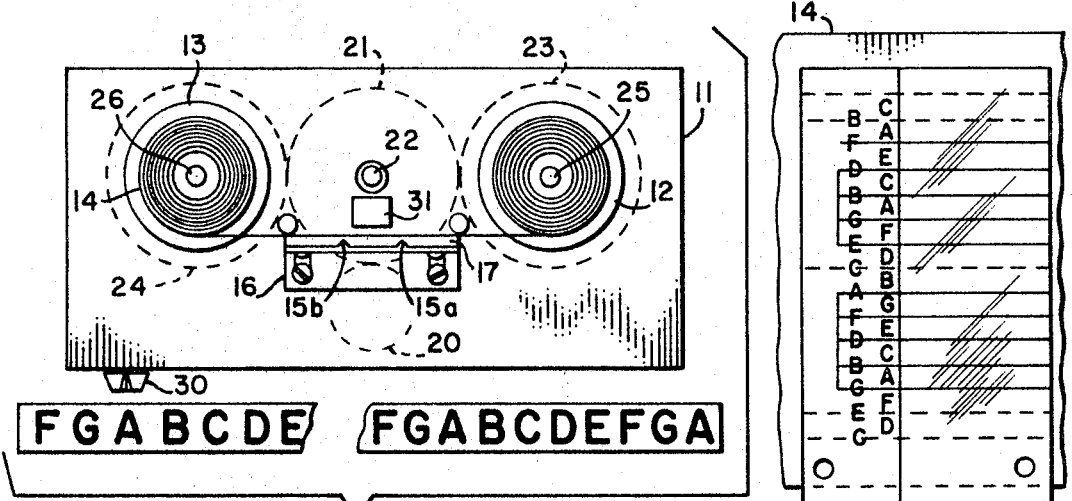
FIG. 2
FIG. 3
INVENTOR.
HAROLD C. KEIR
BY Jack M. Wiseman
ATTORNEY

United States Patent Office 3,463,043
Patented Aug. 26, 1969

ABSTRACT OF THE DISCLOSURE

A music teaching device in which a scroll is transported behind a transparent plate at an adjusted predetermined speed. Musical notes and rests are spaced longitudinally of the scroll in accordance with the time value of these symbols. The notes are also spaced transversely of the scroll in registration with a musical staff which is marked on the transparent plate. An indexing mark is placed on the transparent plate. A note of given time value, for example an eighth note, advances beyond the indexing mark and remains in view as it advances beyond the indexing line for the correct time duration of this note. For a note of longer time value, a line is drawn following the note so that such line remains in view after the note advances beyond the indexing line for the correct duration of the longer note. The scroll may have associated words of a song printed in registration with the corresponding notes, and may have fiducial marks for permitting the generation of an audible rhythm accompaniment. A letter index is placed along the edge of the staff on the transparent plate so that the letter designation of a note can be identified. This device aids the beginning music student to immediately combine not recognition with rhythm, and permits a more rapid and less frustrating development of the proper sensory responses to the musical symbols. After the initial development of these skills, the student may continue his musical training from standard written sheet music.

---

The present invention relates to a device for aiding a beginning music student in learning to read and interpret standard written music.

The forms and symbols used in standard written music have been adopted primarily for convenience in communicating musical composition to the accomplished musician. It is often quite difficult for a beginning music student to learn to read and interpret such written music, and this difficulty tends to inhibit and frustrate the development of the necessary sensory responses for singing or playing the correct written notes with the proper timing and sequence. Heretofore, the various devices which have been used to overcome this initial frustration of the beginning music student have required the introduction of special simplified notations. A student who has learned music in this way either has to rely on such special notation indefinitely, which obviously limits his musical development, or he must first start learning to read standard music and to coordinate his sensory responses with such standard music. The re-learning process is usually more difficult than if the student had not initially relied on the special notation.

One object of the present invention is to provide a simple and inexpensive music teaching device which both aids the beginning music student in developing his sensory responses and also teaches the student to respond to standard musical notation.

Another object of the present invention is to provide a music teaching device wherein a strip with longitudinally spaced musical symbols is advanced at adjusted preselected speeds past an indexing marker.

One feature of the present invention is the provision of a music teaching device having a strip with longitudinally spaced musical symbols, said strip being automatically transported past an indexing mark in the correct time sequence for said symbols.

Another feature of the present invention is the provision of a music teaching device having a strip with longitudinally spaced musical notes which advances behind a transparent member having a musical staff inscribed thereon, said musical notes being transversely spaced on said strip so as to register with said musical staff.

Another feature of the present invention is the provision of a music teaching device having a strip with musical symbols longitudinally spaced in accordance with the time value of said symbols and which strip may, if desired, have the words of a song, and/or markings effective to actuate a rhythm accompaniment, in registration with said symbols.

The various features and advantages of the present invention will become more apparent upon a consideration of the following description taken in connection with the accompanying drawing, wherein:

FIGURE 1 is a front view, with front panel partially broken away, of a music teaching device embodying the present invention;

FIGURE 2 is a top view of the music teaching device of FIGURE 1; and

FIGURE 3 is an elevation view of a modification of the transparent plate employed in the device of the present invention.

A music teaching device 10 in accordance with the present invention, as shown in FIGURES 1 and 2, comprises a base 11 on which are mounted two rotatable cylindrical spools 12 and 13. The spools 12 and 13 carry a long paper strip or scroll 14 having musical notes 14a through 14e printed thereon. As the spools 12 and 13 rotate clockwise, as viewed from the top (FIGURE 2), the notes on the scroll 14 move from right to left as viewed from the front (FIGURE 1) while passing behind a transparent plastic plate 15 supported perpendicular to the top of the base 11 by a right angle bracket 16.

Two parallel vertical lines 15a and 15b are inscribed on the transparent plate 15. The student focuses his attention on the space between the lines and selects the note approaching the guide line 15b, while benefiting from the tune line 15a for preparation to play the succeeding note. A plurality of parallel horizontal lines 15c, 15d, 15e, etc., representative of the lines of a musical staff, are also inscribed on the transparent plate 15. An indexing strip 17 having the letter designation of the notes is registered with this horizontal line staff. It is to be understood that the ransptarent plate 15 may be arranged to have different symbols coordinated to reflect the different types of scrolls for playing with different skills.

A conventional variable-speed, reversible, motor 18, housed inside the base 11, is used to drive the scroll 14. The motor 18 has a shaft with a rubber wheel 20 at the end thereof. The wheel 20 engages a rubber drive wheel 21 having a spindle 22 which is rotatably mounted from the top of the base 11. The drive wheel 21 engages, on opposite sides thereof, a rubber wheel 43 affixed to the end of a spindle 25 of the spool 12, and a rubber wheel 24 affixed to the end of a spindle 26 of the spool 13. Suitable idler rolls 28 and 29 are disposed between the wheels 23 and 24.

An important feature of the present invention is the fact that the length of the space occupied by each symbol and the following marker line is directly proportional to the time value of that symbol. As shown in FIGURE 1, the space between the eighth note 14b and the following 14c is substantially equal to the distance between the indexing lines 15a and 15b. The quarter note 14d has a time value which is twice that of the eighth note 14b, and thus the space between the quarter note 14d and the following note 14e is twice as long as the space between the notes 14b and 14c. The half note 14a has a time value which is twice that of the quarter note 14d, and thus the space between the half note 14a and the following note 14b is twice as long as the space between notes 14d and 14e. The length of time for which the half note 14a is to be sustained is represented by the length of the horizontal line 14f following note 14a, and the length of time for which the quarter note 14d is sustained is represented by the length of the horizontal line 14g following note 14d. If rest symbols occur in the music, they would be spaced in the same manner in accordance with their time value. For example, if the eighth note 14c were replaced by an eighth rest, the note 14d would remain in the same position shown. However, if the eighth note 14c where replaced by a dotted quarter rest, then the note 14d would be moved to the position of the note 14e with a duration line fifty percent longer than the line 14g drawn therebetween. In the example just described, the eighth note is taken as the smallest time unit (corresponding to the separation between indexing lines 14a and 15b). It is obvious that a note of either smaller or larger time value could be used for the time unit.

When desired, fiducial markings 14h, 14i etc., are placed on the scroll 14 at the point of initiation of each beat and/or words 14j, 14k etc., are placed on the scroll 14 above the notes corresponding to such words in a song.

For normal use, the motor 18 is driven to turn the motor wheel 20 clockwise so that the drive wheel 21 turns clockwise and the driven wheels 23 and 24 turn clockwise as viewed from the top (FIGURE 2), thereby moving the scroll 14 from right to left as viewed from the front (FIGURE 1). The operator adjusts the speed of the motor 18 by a calibrated knob 30 in accordance with the desired tempo of the music. For example, if the tempo of 100 beats per minute is used, the knob 30 is set to that position at which the fiducial marks 14h, 14i etc. pass a fixed position, such as the index line 15a, at a rate of 100 marks per minute. Additionally, the speed of the motor 18 can be regulated to advance the scroll 14 at a speed commensurate with the skill of the player until the player achieves sufficient skill to play at the desired tempo of the music.

The music as written on the scroll 14 differs from standard written music in two principal respects. The first is that the symbols are spaced in accordance with their time value, as previously discussed. The second is that the symbols are not printed on a staff. However, they are vertically spaced so that they will register with the staff 15c, 15d, 15e etc. when passing behind the transparent plate 15. The letter name of the note can be obtained from the indexing strip 17, which as shown in FIGURE 1 is for the treble clef. Obviously, different strips 17 may be used for different clefs or for combinations of clefs. For example, notes may be written on the scroll 14 for both the right and left hand (treble clef and bass clef) parts of piano music, preferably in a different color for each hand, and the strip 17 would then contain an index (again preferably in different colors) for each hand.

In use, the operator focuses his attention on the position of the scroll 14 passing between the index markers 15a and 15b in the manner above described. A note is initiated as soon as it reaches the marker 15b and is held as long as the duration line is passing the marker line 15b. The duration line is the horizontal line such as 14f and 14g, that follows the note being played. Eighth notes 14b and 14c remain in the viewing area for the length of time that these notes are to be sustained. The longer half note 14a and quarter note 14d are sustained as long as their respective duration lines 14f and 14g remain in view. The letter name of the note, as vertically registered in the staff 15c, 15d, 15e etc., is readily identified from the index strip 17. Auxiliary devices may be used to help the student coordinate the letter name of the note with a particular instrument. For example, in the case of a piano, a letter cloth strip may be laid over the keyboard with the letters registering the appropriate key. To reread any desired portion of the scroll 14, the motor 18 is reversed by conventional means (not shown).

If desired, the fiducial marks 14h, 14i etc. may be made from magnetic ink whereby the passage of these marks pass the note initiation index 15a gives rise to an audible click as picked up by a conventional sensing and speaker unit 31 as shown in FIGURE 2. Thus, there is provided a metronome automatically synchronized with the music being read. As will be apparent to those skilled in the art, accompanying audible effects may also be produced by coded punches in the scroll 14 with suitable detection circuits. In addition to a simple metronome beat, a more complex rhythm pattern accompaniment could be provided in this manner.

It should be noted that the device 10 just described aids the beginning music student to immediately combine note recognition with rhythm, since the device automatically presents the notes to the staff viewing area in the proper time sequence. This will permit a more rapid and less frustrating development of the proper sensory responses to music symbols. After the initial development of these skills, the student may then continue his music training from standard written sheet music.

Having thus described my invention, what I claim as new and desire to protect by Letters Patent is:

1. A music teaching device, comprising: an indexing member with an indexing mark thereon; a strip member having a plurality of musical symbols longitudinally spaced thereon, the spacing between each symbol and the following symbol being proportional to the time value of said each symbol; means for transporting said strip member relative to said indexing member in a direction substantially at right angles to said index mark at a predetermined rate, whereby said musical symbols may be observed passing said index mark in the correct time sequence for said symbols; said indexing member being formed with a plurality of parallel lines extending in the direction in which said strip member is transported, said lines being representative of a musical staff; said musical symbols being transversely disposed on said strip member to register with the correct position on said musical staff; and a note letter index affixed to said indexing member and registered with said musical staff so that the note letters of the index are aligned with the correct corresponding position on said staff.

2. A music teaching device as claimed in claim 1 wherein a time duration line follows an associated symbol of said symbols and passes said indexing mark for the correct time duration of the associated symbol.

3. A music teaching device as claimed in claim 2 wherein said time duration mark is a horizontally disposed mark.

4. A music teaching device according to claim 1 wherein corresponding words of a song are marked on said strip member in registration with said musical symbols.

5. A music teaching device according to claim 1 wherein rhythm indications are placed on said strip member in registration with said musical symbols.

6. A music teaching device according to claim 5 wherein said indications are spaced in accordance with a given beat pattern; and further including means responsive to the transporting of said strip member relative to said indexing member for generating audible rhythm sounds.

7. A music teaching device according to claim 1 wherein each symbol of a time value greater than a given time value is followed by a line which passes said indexing mark for the correct time duration of said symbol.

8. A music teaching device according to claim 1 and comprising means for varying the rate at which said strip member is transported.

9. A music teaching device according to claim 1 and comprising a pair of spools, said strip being supported as a scroll between said spools so that a given point on said strip is unwound from one of said spools, passes behind said transparent member, and is then wound on the other of said spools.

10. A music teaching device as claimed in claim 1 and comprising means for reversing the direction of travel of said strip member.

11. A music teaching device as claimed in claim 1 wherein said indexing member is transparent.

References Cited

UNITED STATES PATENTS

| | | | |
|---|---|---|---|
| 1,837,944 | 12/1931 | Blum | 84—484 |
| 2,941,436 | 6/1960 | Ericksen | 84—470 |
| 3,379,087 | 4/1968 | Weitzner | 84—483 |

RICHARD B. WILKINSON, Primary Examiner

L. R. FRANKLIN, Assistant Examiner

U.S. Cl. X.R.

84—484